United States Patent
Bohner et al.

[11] Patent Number: 5,953,978
[45] Date of Patent: Sep. 21, 1999

[54] HYDRAULIC POWER STEERING SYSTEM

[75] Inventors: Hubert Bohner, Boeblingen; Martin Moser, Fellbach, both of Germany

[73] Assignee: Daimler-Benz Aktiengesellschaft, Germany

[21] Appl. No.: 09/077,966
[22] PCT Filed: Nov. 14, 1996
[86] PCT No.: PCT/EP96/04997
   § 371 Date: Jun. 15, 1998
   § 102(e) Date: Jun. 15, 1998
[87] PCT Pub. No.: WO97/22508
   PCT Pub. Date: Jun. 26, 1997

[30]     Foreign Application Priority Data

Dec. 15, 1995  [DE]  Germany .......................... 195 46 942

[51] Int. Cl.⁶ .................. F15B 9/03; B62D 5/12
[52] U.S. Cl. ............. 91/363 A; 91/375 R; 91/446; 91/447; 180/415; 180/422; 180/442
[58] Field of Search .................. 91/375 R, 361, 91/363 A, 446, 447; 180/422, 415, 442

[56]     References Cited

FOREIGN PATENT DOCUMENTS

| 2 040 906 | 1/1971 | France . |
| 42 07 719 | 9/1993 | Germany . |
| 43 04 664 | 8/1994 | Germany . |
| 7-125643  | 5/1995 | Japan . |

*Primary Examiner*—Hoang Nguyen
*Attorney, Agent, or Firm*—Evenson, Edwards, Edwards & Lenahan, P.L.L.C.

[57]     ABSTRACT

The invention relates to a hydraulic power steering system for motor vehicles, in the case of which the manual steering wheel is normally connected only by way of a control system with respect to the drive with a servomotor operating the steered vehicle wheels. In the event of a malfunctioning of the control system, a hydraulic forced coupling is automatically established between the servomotor and a hydraulic delivery unit which is constantly forcibly coupled with the steering handle, in order to form a "hydraulic linkage".

19 Claims, 1 Drawing Sheet

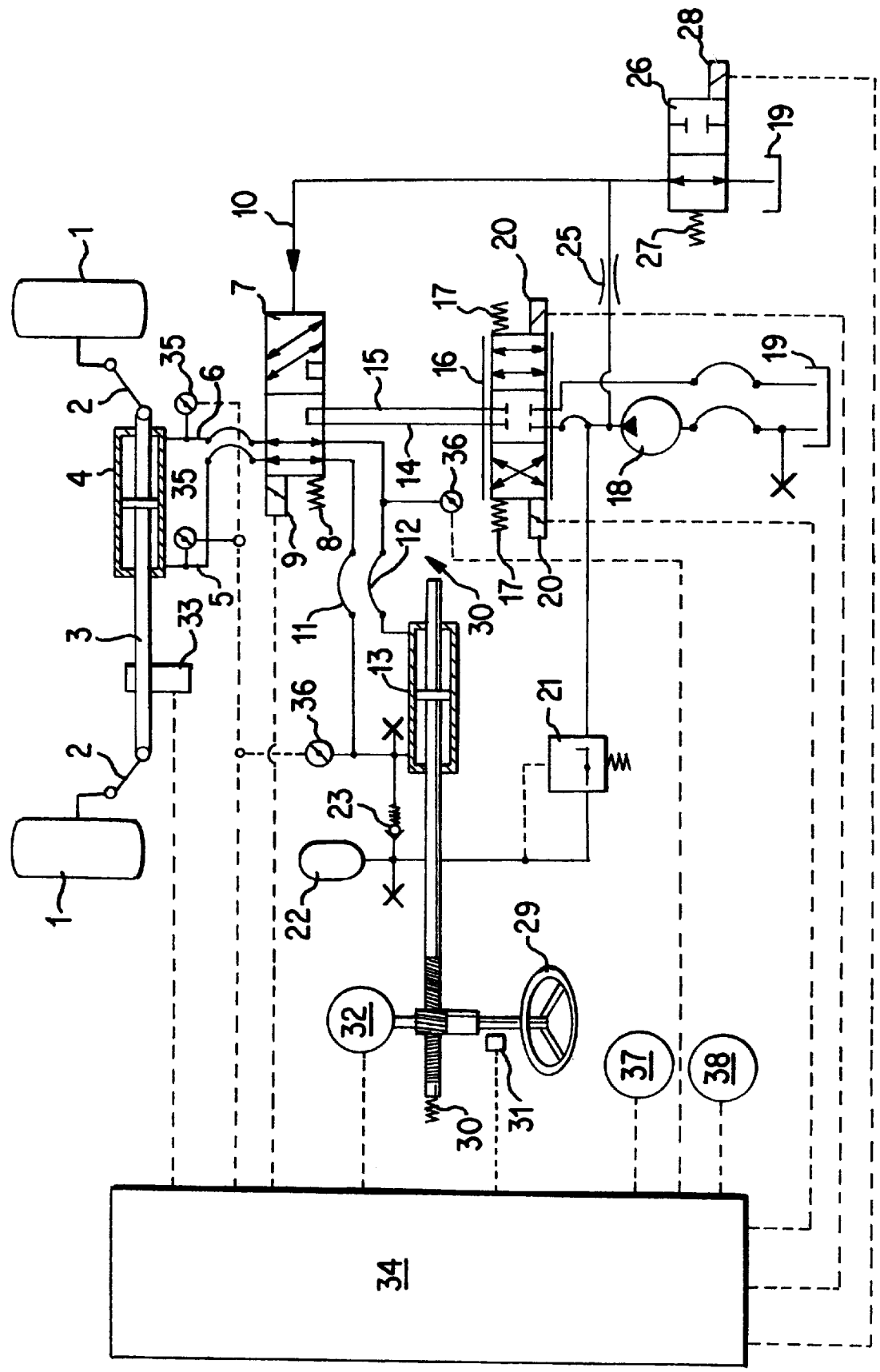

HYDRAULIC POWER STEERING SYSTEM

BACKGROUND AND SUMMARY OF THE INVENTION

This application claims the priority of German patent document 195 46 942.6 filed Dec. 15, 1995, the disclosure(s) of which is (are) expressly incorporated by reference herein.

The present invention relates to a hydraulic power steering system for motor vehicles which has a reversible hydrostatic servomotor connected (with respect to the drive) to mechanical steering elements of steered vehicle wheels. The invention also has a servo valve arrangement which can be controlled via a steering handle (or a manual steering wheel) for the controllable connection of the servomotor with a hydraulic pressure source or a relatively pressureless reservoir.

Power steering systems of this type are generally known and are installed into motor vehicles in series. The servo valve is typically controlled by parts of a mechanical drive connection (or a steering column) between the manual steering wheel and the steering elements. For this purpose, parts of this drive arrangement can be adjusted, relative to one another, as a function of the transmitted forces and torques. The respective adjusting movement is transmitted to the control parts of the servo valve.

Particularly from the field of aircraft manufacturing, it is known to eliminate a mechanical through-drive between the steering handle and the steering elements (for example, pivoted flaps as well as horizontal tail units and rudder units), and to couple the steering handle with the steering elements only with respect to the effect via a control system. In this case, the steering handle operates a desired-value generator and the control system operates a servomotor of the respective steering element which corresponds to a desired-value/actual-value comparison. These steering systems, which are also called "fly-by-wire" systems, have achieved such a high reliability that they are also used in series in passenger planes. A special advantage of such systems is their low space requirement.

It is an object of the present invention to provide a new power steering system which is distinguished by a low space requirement while using as many tested and reliable system components as possible.

This and other objects and advantages are achieved by providing a steering handle which operates an electric or electronic desired-value generator. The electronic desired-value generator is connected with an input of an electronic control system which, in turn, is connected on the output side with the servo valve arrangement. The electronic desired-value generator is also connected via another input with an actual-value generator. This actual-value generator reflects the steering position of the steered vehicle wheels. It is possible to constantly and automatically check the control system with respect to a no-fault operation. Furthermore, the steering handle is forcibly coupled with a reversible hydrostatic delivery element. Additionally, a change-over valve unit is arranged between the servomotor and the delivery element and the servo valve. In the event of a control system malfunction, the change-over valve unit connects the servomotor (while forming a hydraulic linkage) with the delivery element and separates it from the servo valve. In the case of the control system functioning correctly, the change-over valve unit connects the servomotor to the servo valve, on the one hand, and the input and output of the delivery elements to each other, on the other hand.

The present invention is based on the general idea of controlling (during normal operation) the servo valve used for controlling the servomotor only by a desired-value/actual-value comparison of the steering position, and in an emergency (or particularly in the event of disturbances of the control system) establishing a forced hydraulic coupling between the steering handle and the steering elements of the vehicle wheels.

During the operation of the control system, a flexible steering characteristic can be provided in this manner. In particular, the transmission ratio between the steering angle change of the steered wheels and the adjusting stroke of the steering handle (or of the steering wheel) required for this purpose can be changed as a function of parameters.

Minimum space is required for the control system, as well as for the optionally connected hydraulic linkage. Furthermore, the ability to house the system components which are arranged between the steering handle and the steering elements of the steered wheels in a virtually arbitrary manner is particularly advantageous.

For increasing the steering precision of the hydraulic linkage in the event of a malfunctioning of the control system, a preferred embodiment of the invention provides that the delivery element of the steering handle is constantly supplied with a pressure medium (that is, is kept under a hydraulic prestress), and correspondingly constant complete filling with an hydraulic medium is ensured.

Other objects, advantages and novel features of the present invention will become apparent from the following detailed description of the invention when considered in conjunction with the accompanying drawings.

BRIEF DESCRIPTION OF THE DRAWING

The sole FIGURE is a connection-diagram-type representation of the steering system according to the invention.

DETAILED DESCRIPTION OF THE DRAWING

According to the invention, a motor vehicle (riot shown), has an axle with steerable wheels 1 which, for their steering adjustment via tie rods 2, are connected with a piston rod 3 of a double-action piston-cylinder unit 4. When the piston rod 3 is longitudinally displaced in one or the other direction, the wheels 1 are therefore steered to the right or the left.

The two sides of the piston-cylinder unit 4 are connected via lines 5 and 6 with two connections of a change-over valve unit 7 which is constructed as a 6/2 valve. The change-over valve unit 7 is biased, by a spring 8 into the illustrated switching position, and can be brought into its other switching position by energizing a solenoid 9 and/or by admitting hydraulic pressure to a control connection 10.

In the illustrated position of the change-over valve unit 7, the lines 5 and 6 are connected with two lines 11 and 12, respectively. Lines 11 and 12 lead to the two sides of another piston cylinder unit. In addition, in the illustrated position of the change-over valve unit 7, two lines 14 and 15 are connected with one another which lead to a control valve arrangement 16.

In the other position of the change-over valve unit 7, the two lines 11 and 12 are connected with one another so that the piston-cylinder unit 13 is switched to a free-wheeling mode. Additionally, lines 5 and 6 are connected with the lines 14 and 15 leading to the control valve arrangement 16.

The control valve arrangement 16 is biased by springs 17 into the illustrated center position, where lines 14 and 15 are shut off with respect to the pressure connection of a pump 18 as well as with respect to a relatively pressureless hydraulic reservoir 19. The pump 18 is connected on the suction side to reservoir 19. Via solenoids 20, the control valve arrangement 16 can be adjusted into one or the other direction such that the pressure connection of the pump 18 is connected in a substantially throttled manner with line 14. Additionally, line 15 is connected with the reservoir 19. When the control valve arrangement 16 is adjusted in the opposite direction, line 15 is connected with the pressure connection of the pump 18, while line 14 communicates with the reservoir 19.

Furthermore, the pressure connection of the pump 18 is connected via a pressure reducing valve 21 (which opens only when the pressure on its output side falls below a defined threshold value) with a pressure accumulator 22. The pressure accumulator 22 is connected via a return valve 23 to line 11, or one side of the piston-cylinder unit 13.

In order to prevent, under any circumstances, the pressure accumulator 22 discharging toward the pump 18, a return valve (not shown) may be arranged in series in front of or behind the pressure reducing valve 21. As a result, the return valve permits a flow only in the direction toward the pressure accumulator 22.

Furthermore, the pressure connection of the pump 18 may be connected via a throttle 25 with the control connection 10 of the change-over valve unit 7. The pressure on the control connection 10 can be controlled via a change-over valve 26, which is connected between the throttle 15 and the control connection 10. Moreover, the change-over valve 26 is biased via a spring 27 into the illustrated opening position in which the control connection 10 is connected with the reservoir 19 and is correspondingly pressureless. With a solenoid 28, the change-over valve 26 can be changed into the closing position so that the pressure of the delivery side of the pump 18 occurs on the control connection 10.

The piston rod of the piston-cylinder unit 13 is mechanically forcibly coupled with a manual steering wheel 29, (for example, where the piston rod will have a rack section which meshes with a pinion non-rotatably that is arranged on the shaft of the manual steering wheel 29). In addition, the piston rod of the piston-cylinder unit 13 is forced into a center position by springs 30. Moreover, the steering shaft of the manual steering wheel 29 is coupled with a steering angle sensor 31 as well as with, for example, an electric motor 32. The electric motor, in this case, is capable of generating an adjusting resistance or a restoring moment which can be felt on the manual steering wheel 29.

A path sensor or angle sensor 33 is assigned to the steered wheels whose signals reflect the respective steered position of the wheels 1. A computer 34, which is connected on the input side with the sensors 31 and 33, carries out a desired-value/actual-value comparison. In operation, inter alia, the computer 34 compares the desired values defined by the steering angle sensor 31 with the actual value furnished by the path sensor or angle sensor 33 and, on the basis of the desired-value/actual value comparison, operates the piston-cylinder unit 4 (in the manner described below) such that the actual value is adapted to the desired value.

The computer 34 constantly checks both itself and the system with to assure no-fault functioning. As long as computer 34 determines a no-fault operation, the change-over valve unit 7 is held in the position (not shown) so that the piston-cylinder unit 4 is connected with the control valve arrangement 16. The solenoids 20 of control valve arrangement 16 are operated as a function of the above-mentioned desired-value/actual-value comparison by the computer 34. Here, the control valve arrangement 16 (as required) generates a more or less high pressure difference between the lines 14 and 15 and thus between the lines 5 and 6 of the piston-cylinder unit 4. In addition, control valve arrangement 16 correspondingly displaces the piston rod 3, more or less far or fast in one or the other direction, and the wheels 1 are steered accordingly.

The adjustment of the change-over valve unit 7 into the position which is not shown can take place by the corresponding control of the solenoid 9. Instead, or in addition, it is also possible to perform the corresponding adjustment hydraulically. In essence, the computer energizes the solenoid 28 of the change-over valve 26 and brings the change-over valve against the force of its opening spring 27 into its closing position, so that the control input 10 of the change-over valve unit 7 is acted upon by a corresponding hydraulic pressure, and the control valve unit 7 is adjusted against the force of the restoring spring 8 into the position which is not shown.

Should the computer 34 determine a malfunction has occurred, solenoid 9, as well as solenoid 28 of the optionally existing change-over valve 26, are immediately uncoupled from the electric current supply so that the corresponding valves in each case change over into the illustrated positions. When the change-over valve 26 assumes its opening position, the pressure on the hydraulic control connection 10 of the change-over valve unit 7 will immediately fall because (even as the pump 18 continues to run, via the throttle 25) only a minimum hydraulic medium can flow thereafter. Moreover, via the opened change-over valve 26, there is a comparatively throttle-free connection to the relatively pressureless reservoir 19. Since therefore neither a hydraulic pressure exists on the control connection 10 of the change-over valve unit 7, nor the pertaining solenoid 9 is energized, the spring 8 can bring the change-over valve unit 7 into the illustrated position and hold it in this position.

For this purpose, the piston-cylinder unit 4 communicates with the piston-cylinder unit 13 which must always be maximally filled because, while the pump 18 is running, the accumulator 22 is constantly recharged. With the return valve 23, the accumulator constantly seeks to supply hydraulic medium to the piston-cylinder unit 13. A virtually no-play forced hydraulic coupling between the piston-cylinder units 4 and 13 will exist as soon as the change-over valve unit 7 has adopted the position illustrated in the drawing. Since the piston of the piston-cylinder unit 13 is mechanically forcibly coupled with the manual steering wheel 29, the steered wheels 1 are forcibly coupled with the manual steering wheel 29 (i.e., the vehicle can also be safely steered in the event of a failure or malfunction of the computer 34).

Normally, the computer 34 also takes over additional functions. Thus, it is, for example, connected on the input side with pressure gauges 35 (which indicate the hydraulic pressures on both sides of the piston-cylinder unit 4) and therefore the steering forces affect the steered wheels 1. As a function of these signals, the computer 34 can then control the motor 32 so that a manual force can be felt on the manual steering wheel 29. This manual force is related to the steering forces of the steered wheels 1. Although in the normal operation, there is (between the manual steering wheel 29 and the steered wheels 1) neither a mechanical nor a hydraulic through-drive, a steering resistance or a restoring force can be felt at the manual steering wheel 29. If the computer 34 determines a malfunction has occurred, the otherwise non-reversible motor 32 is immediately uncoupled from the current supply because (under such operating conditions) there is a hydraulic forced connection between the manual steering wheel and the steered wheels 1.

Via additional pressure gauges 36, the computer 34 can recognize the pressure conditions on the piston-cylinder unit 13 (which is normally in the freewheeling condition). Particularly, in this manner, the tightness of the piston-cylinder unit 13 (as well as the tightness of the lines connected to it) can be checked. Furthermore the pressure gauge is usable to ensure that the piston-cylinder unit 13 is in fact available in the event of the computer 34 malfunctioning and during the resulting emergency operation for a forced hydraulic coupling between the manual steering wheel 29 and the steered wheels 1.

Additionally, the computer can be connected with sensors 37 and 38, which monitor the lateral acceleration of the vehicle, or its yaw velocity. As a function of these parameters, the computer 34 can (in the normal control operation) change the transmission ratio between the rotating movement or the rotating path of the manual steering wheel 29 and the resulting steering angle change of the steered wheels 1. In particular, the computer 34 can autonomously perform steering (corrections in order to "catch" dangerous driving conditions (e.g., the start of a swerving motion).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A hydraulic power steering system for a motor vehicle, having a reversible hydrostatic servomotor connected to mechanical steering elements of steered vehicle wheels, and having a servo valve arrangement which can be controlled via a steering handle for selectively connecting the servomotor with a hydraulic pressure source and a relatively pressureless reservoir, comprising:
   an electric or electronic desired-value generator which is operative in response to said steering handle;
   an electronic control system, having a first input connected to said desired value generator, a second input connected with an actual-value generator, which provides signals indicative of a steering position of steered vehicle wheels, and an output for connection with the output with the servo valve arrangement;
   a hydrostatic delivery element forcibly coupled with said steering handle; and
   a change-over valve unit arranged between the servomotor, the delivery element and the servo valve for connecting, while forming a hydraulic linkage between the steering handle and the mechanical steering elements of steered vehicle wheels, said servomotor with the delivery element and separating it from the servo valve in the event of a malfunctioning of the control system, and connecting the servomotor to the servo valve and the input and output of the delivery element to one another during correct functioning of the control system.

2. The hydraulic power steering system according to claim 1, wherein the delivery element is constantly connected with a pressure source via a return valve.

3. The hydraulic power steering system according to claim 1, wherein the delivery element is a double-action piston-cylinder unit.

4. The hydraulic power steering system according to claim 2, wherein the delivery element is a double-action piston-cylinder unit.

5. The hydraulic power steering system according to claim 3, wherein the piston-cylinder unit is forcibly mechanically coupled with a manual steering wheel via a rack and a pinion meshing with said manual steering wheel.

6. The hydraulic power steering system according to claim 1, wherein the servomotor is a double-action piston-cylinder unit.

7. The hydraulic power steering system according to claim 2, wherein the servomotor is a double-action piston-cylinder unit.

8. The hydraulic power steering system according to claim 3, wherein the servomotor is a double-action piston-cylinder unit.

9. The hydraulic power steering system according to claim 3, wherein the servomotor and the delivery element are identical piston-cylinder units.

10. The hydraulic power steering system according to claim 5, wherein the servomotor and the delivery element are identical piston-cylinder units.

11. The hydraulic power steering system according to claim 6, wherein the servomotor and the delivery element are identical piston-cylinder units.

12. The hydraulic power steering system according to claim 3, wherein the servomotor and the delivery element are identical piston-cylinder units.

13. The hydraulic power steering system according to claim 1, wherein the control system controls a non-reversible electric motor forcibly coupled with the steering handle for generating a manual force which can be felt on the steering handle during said no-fault operation.

14. The hydraulic power steering system according to claim 2, wherein the control system controls a non-reversible electric motor forcibly coupled with the steering handle for generating a manual force which can be felt on the steering handle during said no-fault operation.

15. The hydraulic power steering system according to claim 3, wherein the control system controls a non-reversible electric motor forcibly coupled with the steering handle for generating a manual force which can be felt on the steering handle during said no-fault operation.

16. The hydraulic power steering system according to claim 1, wherein the control system autonomously initiates steering corrections in order to counteract dangerous driving conditions which can be registered via separate sensors during said no-fault operation.

17. The hydraulic power steering system according to claim 2, wherein the control system autonomously initiates steering corrections in order to counteract dangerous driving conditions which can be registered via separate sensors during said no-fault operation.

18. The hydraulic power steering system according to claim 3, wherein the control system autonomously initiates steering corrections in order to counteract dangerous driving conditions which can be registered via separate sensors during said no-fault operation.

19. A method of controlling a hydraulic power steering system for motor vehicles, comprising the steps of:
   operating an electric or electronic desired-value generator with a steering handle;
   reflecting a position of steered vehicle wheels with an actual-value generator;
   constantly automatically checking a control system for no-fault operation
   forcibly coupling said steering handle with a hydrostatic delivery element; and
   in the event of a malfunction of the control system 15, while forming a hydraulic linkage, connecting a servomotor to the delivery element and separating the delivery element from the servo valve with change-over valve unit, and connecting the servomotor to the servo valve with the change-over valve unit while connecting the input and output of the delivery element to one another during correct functioning of the control system.

* * * * *